April 10, 1934.    A. G. MARANVILLE    1,954,757
RIM FOR PNEUMATIC TIRES
Filed Sept. 10, 1931    5 Sheets-Sheet 1

INVENTOR
Alger G. Maranville
BY
Evans & McCoy
ATTORNEYS

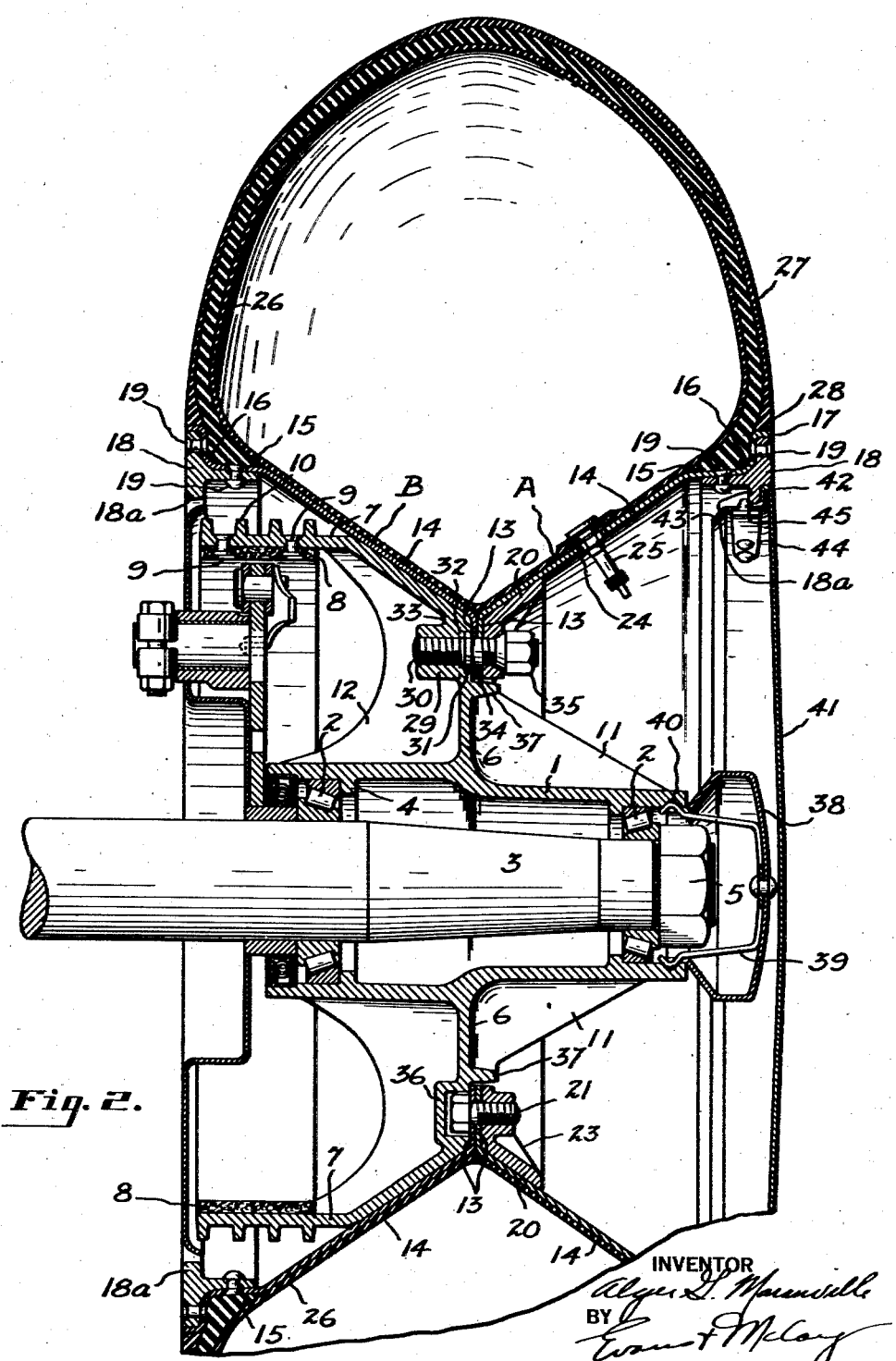

April 10, 1934.  A. G. MARANVILLE  1,954,757
RIM FOR PNEUMATIC TIRES
Filed Sept. 10, 1931   5 Sheets-Sheet 3
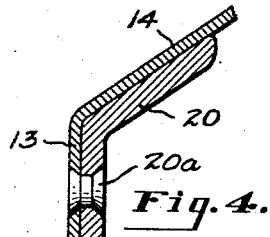
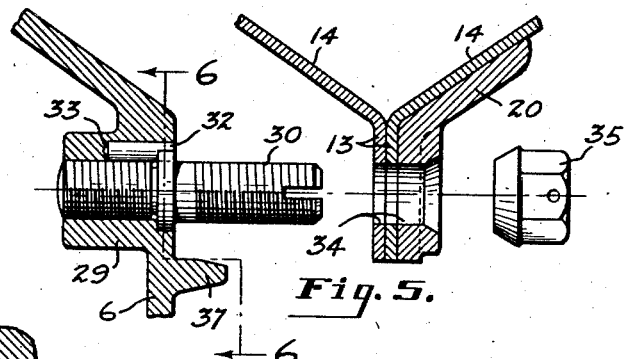
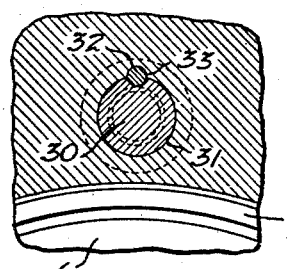
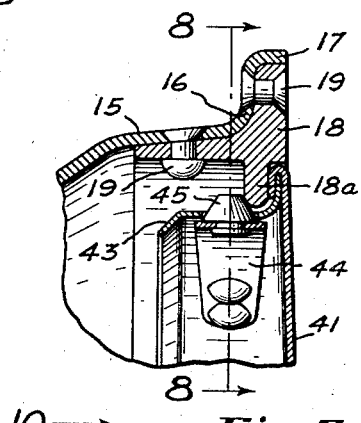
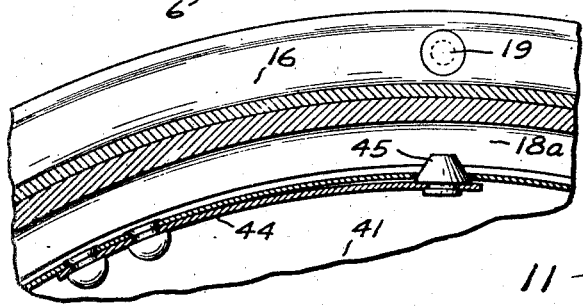
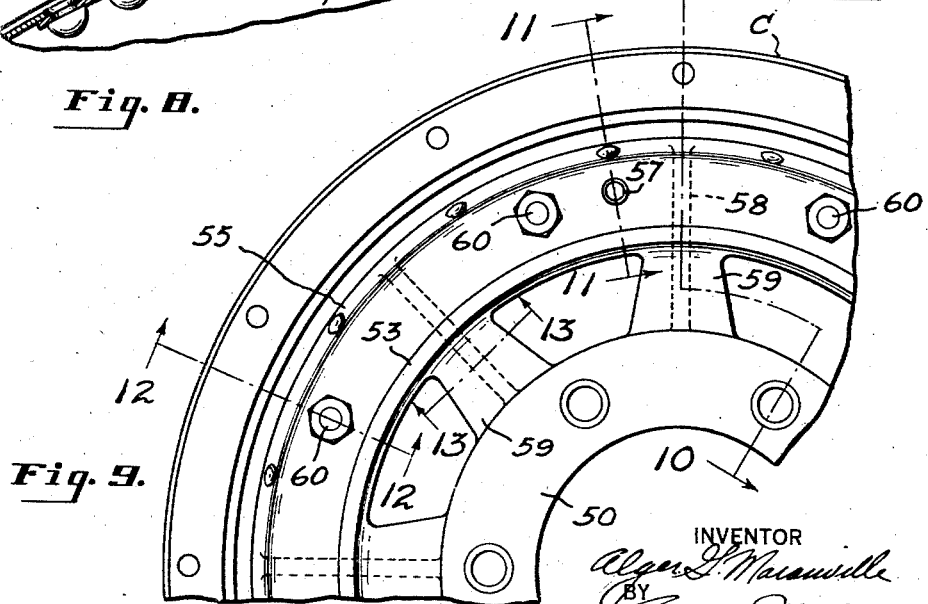
INVENTOR
Alger G. Maranville
BY
Evans & McCoy
ATTORNEYS

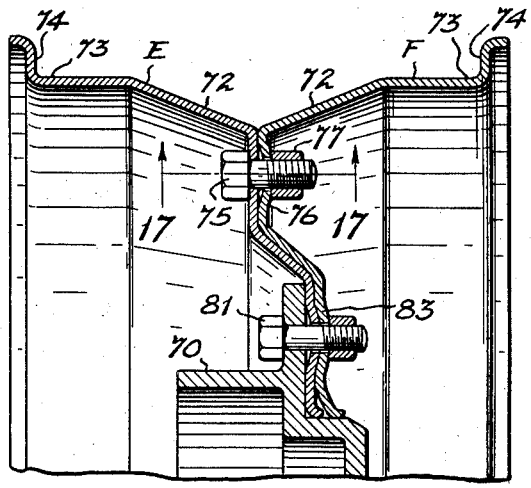
Fig. 15.
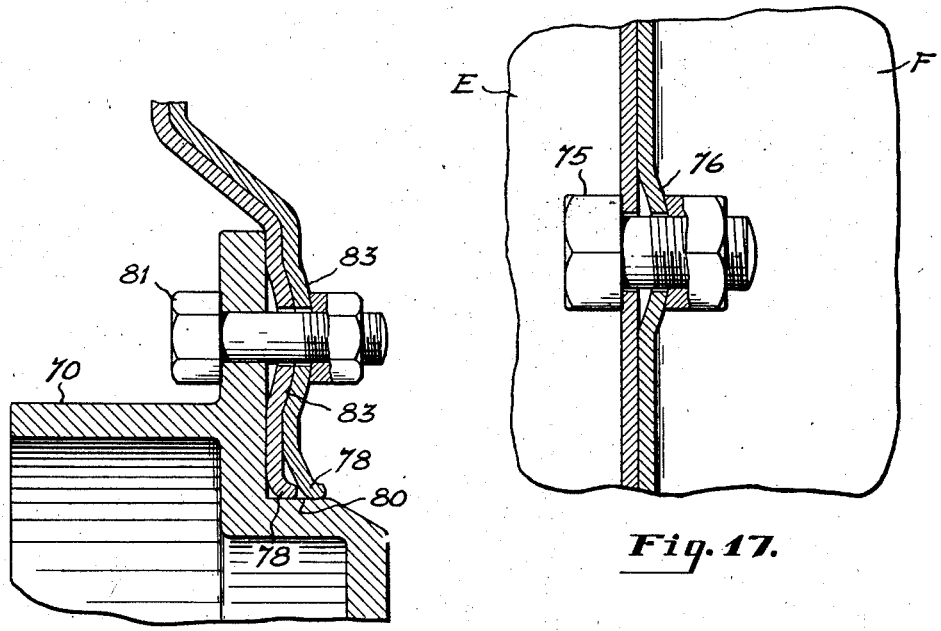
Fig. 16.
Fig. 17.

Patented Apr. 10, 1934

1,954,757

UNITED STATES PATENT OFFICE 1,954,757

RIM FOR PNEUMATIC TIRES

Alger G. Maranville, Akron, Ohio, assignor to The General Tire & Rubber Company, Akron, Ohio, a corporation of Ohio Application September 10, 1931, Serial No. 562,004

14 Claims. (Cl. 152—21)

This invention relates to wheel constructions, and more particularly to demountable wheels and rims for use on airplanes, automobiles, and other vehicles.

In my copending application Serial No. 426,333, filed Feb. 6, 1930 and my co-pending application Serial No. 628,869, filed August 15, 1932, I have shown a pneumatic tire construction having a small diametered relatively wide base and which is stream-lined. The present invention relates to wheels and rims of the demountable type on which tires of the type shown in said copending application and also of the conventional type can be easily and quickly mounted.

One of the objects of the present invention is to provide a demountable wheel and rim construction of an improved type which will safely accommodate pneumatic tires having relatively wide bases and relatively small rim diameters.

Another object is to provide a wheel rim which is demountable from a wheel hub and which can be easily disassembled to permit the removal of a pneumatic tire.

Another object is to provide a pneumatic tire rim for airplanes and motor vehicles of improved construction which can be economically manufactured.

A further object is to provide a wheel and rim construction for airplanes which is sturdy in construction but light in weight.

With the above and other objects in view, the present invention may be said to consist of certain features of construction and combinations of parts which will be apparent to those skilled in the art to which the invention appertains.

In the drawings which illustrate suitable embodiments of the present invention,

Fig. 2 is a transverse section taken substantially on the line 2—2 of Fig. 1;

Fig. 4 is an enlarged section taken substantially on the line 4—4 of Fig. 1 showing the method of securing the hub ring to the axially outward rim half;

Fig. 5 is an enlarged section taken substantially on the line 5—5 of Fig. 1 showing the parts in dis-assembled position to illustrate the manner of removing the assembled rim from the wheel hub;

Fig. 6 is an enlarged section taken substantially on the line 6—6 of Fig. 5 illustrating the manner of locking the hub stud in position on the hub member;

Fig. 7 is an enlarged fragmentary view showing the method of attaching the hub disk to the outer rim half;

Fig. 8 is a section taken substantially on the line 8—8 of Fig. 7;

Fig. 9 is a side elevation of a similar type of wheel and rim for use in motor vehicles and showing a tire mounted thereon;

Fig. 15 is a transverse section through a modified type of a mounting for a vehicle tire of the pneumatic type;

Fig. 16 is an enlarged section showing the manner of inserting the mounting to a wheel hub; and Fig. 17 is an enlarged section taken on the line 17—17 of Fig. 15.

Figure 1:
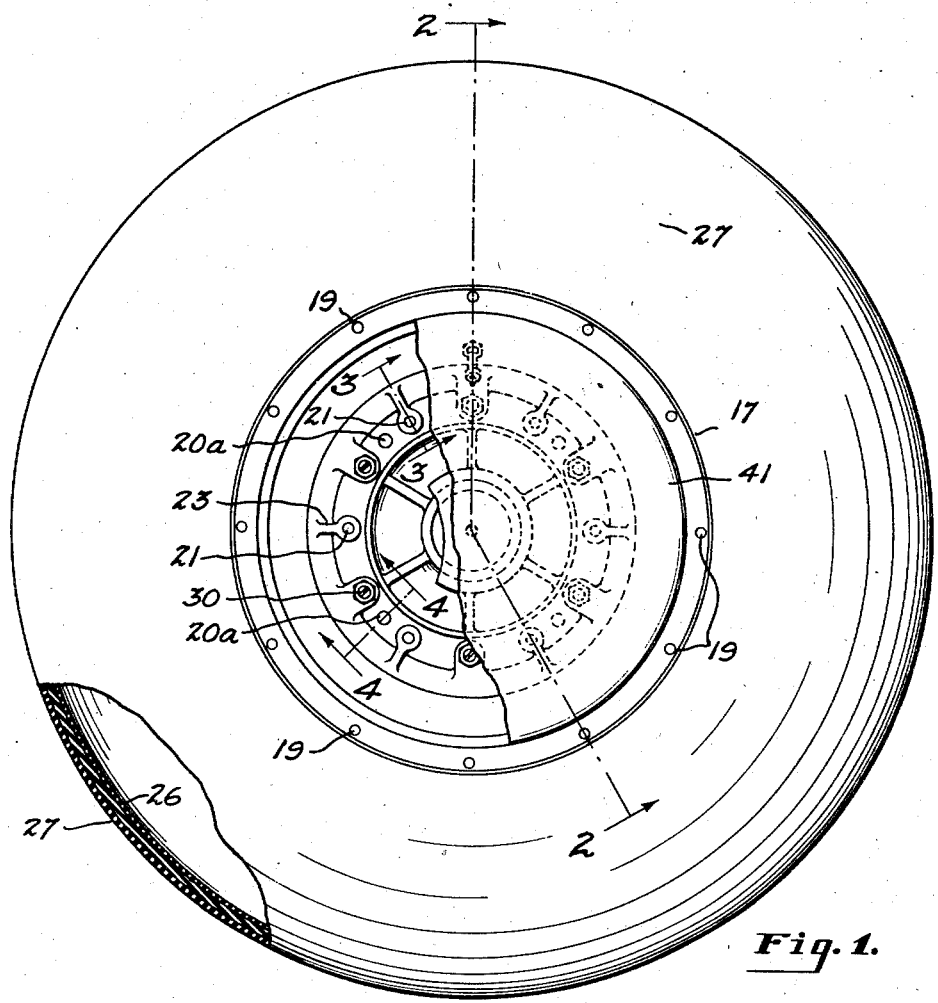
Figure 1 is a side elevation of a demountable wheel and rim suitable for airplanes and having a tire mounted thereon, portions of the axially outward disk being broken away to show the method of mounting the rim to the wheel hub.
Figure 3:
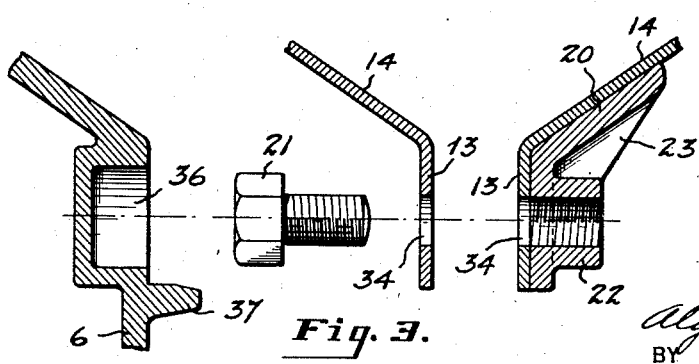
Fig. 3 is an enlarged section taken substantially on the line 3—3 of Fig. 1 and showing the parts of the hub and rim in dis-assembled relation to illustrate the demountable features.

Referring to the accompanying drawings in which like numerals refer to like parts throughout the several views, the construction of the present invention comprises a wheel hub 1 of tubular shape having suitable anti-friction bearings 2 at its ends mounted on a shaft 3. The anti-friction bearings 2 preferably are of the radial end thrust type and arranged to absorb end thrusts of the wheel hub on the shaft 3. The hub is provided with radially inwardly extending flanges 4 which engage against the radially outer races of the bearings and a nut 5 is threaded on the shaft 3 to engage the radially inner race of the axially outermost bearing 2 and hold the hub against movement endwise of the shaft 3. The hub 1 is formed with a circumferential flange 6 intermediate its ends which, at a point radially outwardly of the wheel hub, extends outwardly at an angle for a considerable distance to provide a frusto-conical seat for one of the rim elements to be later described. This upwardly and outwardly extending portion of the flange 6 terminates in a cylindrical portion 7 that forms a brake drum, to the inner circumference of which suitable brake lining 8 may be secured by means of rivets 9. If desired, the outer surfaces of the brake drum 7 may be formed with spaced circumferential ribs 10 to provide cooling means.

The axially outer side of the circumferential flange 6 is braced by means of a plurality of radial ribs 11 which extend at regular intervals from the outboard end of the hub 1 to the flange 6 and terminate at points radially inwardly of the flange 6. The axially opposite side of the flange 6 is also braced and strengthened by means of radial ribs 12 which extend at regular intervals from the inboard end of the hub 1 and are formed integral with the flange 6, with the radially outwardly extending portion of the flange 6, and with a portion of the brake drum 7 as shown in Fig. 2.

The portion of the construction of the present invention comprises axially outer and inner rim halves A and B, respectively. These rim halves are preferably spun from a suitable aluminum alloy and each is formed with an inwardly extending radial flange 13 that abuts in the assembly against the corresponding flange of the other element. From this radial flange 13 the rim half is formed with an inclined portion 14 which extends away from the flange 13 at an angle of approximately 60 degrees, as shown in the drawings, although this angle may be varied to meet various conditions. The angular portion 14 is formed with a bead seat 15 which is formed at a slight angle to the horizontal, as shown in Fig. 2, and which is formed with an outwardly extending radial flange 16 that engages the straight side of the tire bead. The radial flange 16 terminates in a narrow axial flange portion 17 which engages with a portion of the side wall stock of the tire for a purpose to be later described.

Each of the rim halves is strengthened by a reinforcing ring 18 which may be of suitable aluminum alloy and which nests or closely fits the inner circumferential face of the outer portions of the rim half. In other words, the reinforcing ring 18 is formed with a surface that abuts against the inner circumferential surfaces of the tire bead seating portion 15, the radial flange portion 16, and the axial flange portion 17. This ring is secured by means of suitable rivets 19 to the portions 15 and 16 of the rim half. The rim reinforcing ring is also formed with an inwardly extending radial flange portion 18$^a$ that adds considerable strength to the structure and prevents deflection of the outboard portions of the rim half.

The outer rim element A is also further reinforced by means of a hub ring 20 which is formed with angular surfaces, one of which engages with the inwardly extending radial flange 13 and the other of which forms a frusto-conical seat for engagement with a portion of the angular portion 14 of the rim half A, as shown in Figs. 2 and 4. This hub ring is secured to the radial flange 13 by means of suitable rivets 20$^a$.

The ring halves A and B are assembled together with the flanges 13 in abutting relation by means of cap screws 21 that extend through openings in the flange 13 of the rim half B and thread into bosses 22 formed on the outboard face of the hub ring 20 which provides a hub securing means for holding the two rim halves together. The hub ring 20 is reinforced with ribs 23 which extend from the bosses up to the outermost part of the hub ring. The outer rim half A is provided with a valve stem opening 24 through which the valve 25 of the tire inner tube 26 extends.

The tire 27 is formed with overhanging portions 28 of rubber stock adjacent the radial faces of the beads which, when the tire is inflated, compress and tightly engage with the axial flanges 17 of the rim halves and form a dirt and water-tight seal.

The rim halves A and B are demountable from each other to permit an easy assembly of the tire casing thereto and furthermore the tire rim is demountable as a unit from the wheel hub. This is accomplished by forming axially inwardly extending bosses 29 on the inner face of the axially radial flange 6 into which securing studs 30 are threaded. These studs 30 are provided with a flange 31 arranged to seat in a recess formed on the axially outer surface of the flange 6 and lie substantially flush with this surface. The flange 31 is provided with a notched out recess and a pin 32 is extended through this recess and through an opening 33 provided in the boss 29 parallel with the stud 30 to hold the stud against rotation when it is in its proper position. The studs 30 extend outwardly from the flange 6 and are provided with threaded outer ends and the assembled rim halves are clamped to the radial flange 6 by means of these studs 30 which extend through openings 34 formed in the flanges 13 of the rim halves and the hub ring 20. Suitable nuts 35 are threaded on the outer ends of the studs 30 and clamp the assembled rim halves to the flange 6.

In the assembled position the heads of the cap screws 21 which bolt the two rim halves together extend into a recess 36 formed in the face of the flange 6.

An axial locating flange 37 is formed on the radial flange 6 to assist in locating the assembled rim halves on the wheel hub. The radially outer circumferential surface of the flange 37 is of a diameter slightly less than the diameter of the hub ring and axial surfaces of the rim flanges 13 so as to prevent binding when the rim elements are assembled to the wheel hub.

When the assembled rim halves are mounted on the wheel hub the axially inner face of the flange 13 of the rim half B is clamped against the face of the hub flange 6 and the angular portion 14 of the rim half B is seated against and strengthened by the outwardly extending portion of the flange 6, as shown in Fig. 2. The other rim half A, as previously described, is reinforced by means of the hub ring 20 which seats against the radially inner surface of the angular portion 14.

The open end of the hub 1 is closed in by a hub cap portion 38 spun from suitable metal which has an axial flange portion that engages with the inner periphery of the hub 1. This hub cap is held in position by means of resilient straps 39 secured thereto and which have end portions that snap into recesses 40 formed on the inner periphery of the hub 1.

In order to assist in the stream-lining of the wheel and rim construction and to present a neat appearance, the axially outer rim half is completely closed in. This is accomplished by means of a circular disk 41 that fits within a circular depression 42 formed in the flange 19 of the outer rim reinforcing ring 18. The marginal edges of the disk 41 are clinched around the edges of an axially inwardly extending axial ring 43 which extends inwardly beyond the flange 19. Resilient spring members 44 are secured to the inner face of the ring 43 and are provided with conical pins 45 which extend through openings formed in the ring 43 and arranged to engage the axially inner side of the flange 18ª, as shown in Fig. 7. The cover disk 41 is released by merely moving the spring member 44 inwardly toward the hub to release the pins 45 from their engagement with the flange 18ª.

The wheel and rim construction just described is of very sturdy construction and adapted for airplane use since it permits the use of a wide and small diametered base tire casing without sacrificing strength and without preventing the use of a brake drum. Furthermore, the wheel and braking apparatus used in connection therewith are very compactly arranged in the construction shown. The rim portion is furthermore so arranged that the hub will absorb end thrust without distortion through the medium of the reinforced inclined or angular portions of the rim halves. The ribs 11 and 12 formed on the hub portion also assist in absorbing end thrust and preventing deflection of the rim supporting flange 6.

In Figs. 9 to 14, inclusive, a similar construction is shown for use in motor vehicles. In this construction, however, the wheel and rim assembly is secured directly to the conventional hub and brake drum of a motor vehicle. The construction shown in these views embodies a central disk portion 50 having a radially inner portion for attachment to a wheel hub of conventional type through suitable bolts, and an outer radial portion 51 which terminates in a reinforcing flange 52 arranged at an angle approximately 20 degrees to the axis of the radial portion 51.

The radial portion 51 is also formed with an axial centering flange 53 having a machined outer surface, the flange being arranged radially inwardly of the outer periphery of the portion 51.

The rim elements C and D are of the same general shape as the rim elements previously described, and each is provided with an inner radial securing flange 54 which, when the elements are assembled, abut against each other. In this construction the rim element D is secured by rivets 55 directly to the angular flange 52 in the same manner that the rim element C is secured to the angular hub ring 56.

Figure 11:
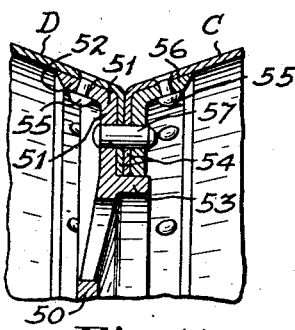
Fig. 11 is an enlarged section taken substantially on the line 11—11 of Fig. 9.
Figure 12:
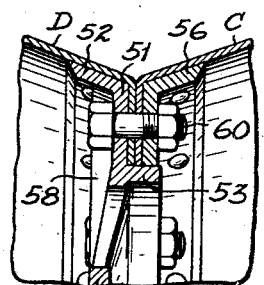
Fig. 12 is a section taken substantially on the line 12—12 of Fig. 9.
Figure 14:
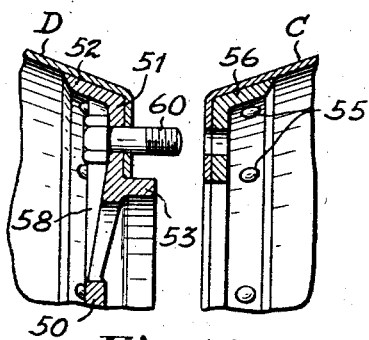
Fig. 14 is a dis-assembled view of the rim construction shown in Figs. 9 to 13.
Figure 13:
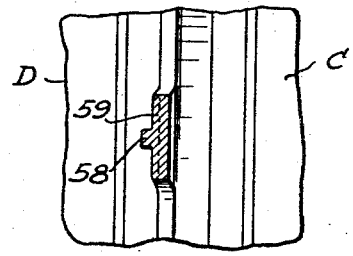
Fig. 13 is a section taken substantially on the line 13—13 of Fig. 9 to illustrate the bracing ribs for the wheel spokes.

In order to insure that the rim elements will always be secured together in the same relationship, dowel pins 57 are mounted in the portion 51 at irregular intervals, as shown in Fig. 11. These dowel pins extend through openings in the flange 54 of the rim element C and the hub ring 56 and provide means for aligning the rim elements. The radially inner peripheries of the flange 54 and hub ring 56 are further finished so as to have a sliding fit with the machined surface of the axial centering flange 53 in order to provide additional locating means for the rim element C with respect to the element D.

Figure 10:
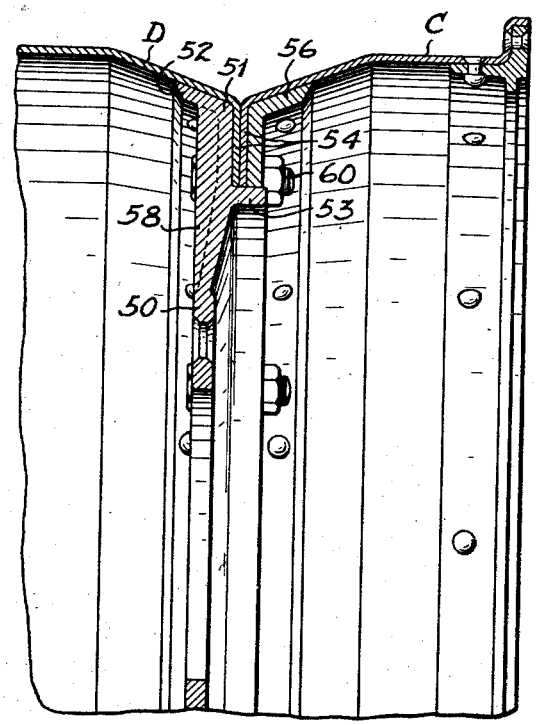
Fig. 10 is a section taken substantially on the line 10—10 of Fig. 9.

As shown in Fig. 10, the portion 51 is offset slightly with respect to the inner radial securing portion 50 and in order to strengthen the same a plurality of ribs 58 are provided to extend from the portion 50 to the angular flange 52.

As shown in Fig. 9, the metal between the portions 50 and 51 is cut away at regular intervals to provide spoke portions 59. However, the same may be of disk-like construction if desired. In the wheel and rim construction last described, the tire may be easily mounted on the rim without removing the wheel portion from the vehicle by merely removing the bolts 60 which secured the two parts together and which permit the element C to be easily removed. In some cases, however, it may be desired to remove the complete wheel assembly from the vehicle by loosening the nuts which secure the portion 50 to the flange hub and then after the wheel assembly is removed by removing the rim element C in the manner described.

In the airplane construction first described, the assembled rim elements A and B are first bodily removed from the wheel hub 1 by threading the nuts 35 and then after the rim assembly is removed the rim elements are separated by removing the cap screws 21 which permits a quick and easy mounting of the tire casing on the rim elements.

It will be noted that in both constructions described, the tire rim is separated on a median plane. The rim elements furthermore are demountable from the wheel hub as a unit and are also separable from each other. In each construction, means is provided that the rim elements will be assembled in their proper relationship. The rim elements in both constructions are very rigidly reinforced at their outer edges and are also rigidly reinforced at their centers where the load is transmitted to the wheel hubs.

A modified type of tire mounting is shown in Figs. 15 to 17. As shown in these views, the rim portions both form a wheel of the disk type. The mounting is shown as mounted on a vehicle wheel hub 70 on which provisions have been made to insure proper alignment of the wheel and rim sections E and F with respect to the hub 70 and with respect to each other.

Each section embodies an annular radial portion 71 having an inclined peripheral flange 72 that extends outwardly and terminates in an axial tire bead seat 73, the tire bead seat 73 being formed at its edge with a suitable radial flange 74.

In the construction shown in Fig. 15, the two sections are arranged to be first secured together by suitable bolts 75 and then secured as a unit to the wheel hub 70. Means is provided in this construction to provide a yielding lock between the two sections. This, as shown in Fig. 15, is accomplished by forming one of the elements with an outwardly bulging portion 76 in the region of each hole through which the clamping bolt 75 extends. The nut 77 is formed with a curved surface to fit the bulging portion 76. It is obvious that as the sections are clamped together, the bulging portions 76 will yield to some extent and thereby provide a very rigid clamping connection.

In order to assist in the proper alignment of the two sections, the radial portions 71 are offset to provide nesting locating shoulders 78.

The inner marginal edges of the radial portions 71 are flared slightly at 79, as shown in Fig. 15, and are arranged to engage with a cylindrical shoulder 80 formed on the hub 70 with a very snug fit in order to properly position the wheel and rim unit on the hub 70.

The securing bolts 81 in the present case are not subjected to shearing stresses and fit within the bolt openings of the sections with a material clearance as indicated in Fig. 16. If desired, the innermost radial portions 71 in the region of the bolt openings may also be bulged outwardly at 83, so that when the securing nuts 82 are tightened, the portions 83 will yield and thereby provide a very rigid attachment between the wheel unit and hub.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A wheel and rim construction comprising an annular hub having a radial flange and a pair of rim elements each having a radially inwardly extending inner flange abutting the other and detachably secured to said radial hub flange, an integral outwardly extending angle portion diverging away from the corresponding angle portion of the other at a substantial angle, and an integral angular bead seat portion, each said angular bead seat portion having an angular reinforcing ring fitted against and rigidly secured to the angle portions of said bead seat portion.

2. A wheel and rim construction comprising an annular hub having an outwardly extending radial flange terminating in an angle portion extending outwardly at an angle thereto and a pair of rim elements each having a radially inwardly extending inner flange abutting the other and an outwardly extending angle portion terminating in an angular bead seat, said radial flanges of said rim elements being detachably secured to said radial flange, the angle portion of one of said rim elements being seated against the said angle portion of said hub flange and the angle portion of the other rim element having a reinforcing ring rigidly secured thereto.

3. A wheel and rim construction comprising an annular hub having an outwardly extending radial flange terminating in an angle portion extending outwardly at an angle thereto and a pair of rim elements each having a radially inwardly extending inner flange abutting the other and an outwardly extending angle portion terminating in an angular bead seat, said radial flanges of said rim elements being detachably secured to said radial hub flange, the angle portion of one of said rim elements being seated against the said angle portion of said hub flange and the other of said rim elements having an angular hub ring secured to its radial portion and seating against its angle portion.

4. A wheel and rim construction comprising an annular hub having an outwardly extending radial flange terminating in an angle portion extending outwardly therefrom and axial webs integral with said radial flange at opposite sides thereof, the webs at one side of said flange being integral with said angle portion, a pair of rim elements each having a radially inwardly extending flange detachably secured to the other and an outwardly extending angle portion diverging away from the other, an angular hub ring rigidly secured to the radial flange of one rim element and abutting the angle portion thereof, the other rim element having its radial flange and angle portion respectively abutting the radial flange and angle portion of said hub, a plurality of studs secured to said hub flange and extending through said rim element flanges and hub ring, and nuts threaded on said studs for rigidly clamping said rim elements against said hub flange.

5. A wheel and rim construction comprising a radial wheel portion, a rim half secured to the peripheral surface of said wheel portion and having a radially inwardly extending flange abutting said wheel portion, a second rim half also having a radial flange, a hub ring secured to said second rim half, and bolt means extending through said wheel portion and hub ring for rigidly and detachably clamping said rim halves together.

6. A wheel and rim construction comprising a radial wheel portion, a rim half secured to the peripheral surface of said wheel portion and having a radially inwardly extending flange abutting said wheel portion, a second rim half also having a radial flange, a hub ring secured to said second rim half, dowel pins carried by said wheel portion and extending through said second rim half and hub ring for aligning said rim halves, and bolt means extending through said wheel portion and hub ring for rigidly and detachably clamping said rim halves together.

7. A wheel and rim construction comprising a radial wheel portion, a rim half secured to the peripheral surface of said wheel portion and having a radially inwardly extending flange abutting said wheel portion, a second rim half also having a radial flange, a hub ring secured to said second rim half, an annular axial flange on said wheel portion having a sliding fit with said radial flange of said second rim half, and bolt means extending through said wheel portion and hub ring for rigidly and detachably clamping said rim halves together.

8. A wheel and rim construction comprising a radial wheel portion, a rim half secured to the peripheral surface of said wheel portion and having a radially inwardly extending flange abutting said wheel portion, a second rim half also having a radial flange, a hub ring secured to said second rim half, dowel pins carried by said wheel portion and extending through said second rim half and hub ring for aligning said rim halves, an annular axial flange on said wheel portion having a sliding fit with said radial flange of said second rim half, and bolt means extending through said wheel portion and hub ring for rigidly and detachably clamping said rim halves together.

9. A wheel and rim construction comprising a radial wheel portion having a marginal flange extending at an angle thereto, an angular rim half rigidly secured to said flange and having a radially inwardly extending flange abutting against said wheel portion, a second rim half having a radial flange, an annular hub ring secured to said second rim half and having a radial portion abutting against said last mentioned flange, and bolt means extending through said wheel portion and hub ring for rigidly and detachably clamping said rim halves together.

10. A wheel and rim construction comprising a pair of annular metal sections, each having a radial portion and an axial portion for seating and supporting one bead of a pneumatic tire casing, one of said sections having in its radial portion near the periphery thereof portions bulging outwardly away from the other of said sections, and securing bolts extending through the said bulging portions and through the other of said sections for compressing said bulging portions and rigidly securing said sections together.

11. A wheel and rim construction for pneumatic tires, comprising a hub having a radially outwardly extending flange, a rim including a pair of rim halves, each of said rim halves having radially inwardly extending portions abutting the other substantially at the median plane of said rim, an integral frustro-conical portion diverging outwardly away from the plane of the radial portion at an angle materially less than ninety degrees, and an integral bead engaging portion at the marginal edge of the frustro-conical portion, means securing the radial portions of said rim halves to said radial flange of said hub, and a separate means for detachably securing said radial portions together.

12. A wheel and rim structure comprising a disk-like portion having an integral circumferential flange flaring outwardly at an angle thereto, a rim half having an inwardly extending radial portion abutting said disk-like portion and a conical portion seating against said circumferential flange, a second rim half having an inwardly extending radial portion abutting the corresponding radial portion of said first rim half, a conical portion diverging away from said first conical portion at a material angle and a reinforcing ring having a flange abutting said radial portion and a flange abutting said conical portion of said second rim half, and bolt means securing said rim halves together.

13. In a wheel and rim structure a rim comprising a pair of rim halves having radial portions abutting each other and conical portions diverging away from each other at a substantial acute angle, each of said conical portions terminating in a bead supporting portion including a generally axial bead seat and a radial flange and having a continuous reinforcing ring of angular cross section, one portion of said ring being secured to said bead seat and one portion being secured to said radial flange.

14. A wheel and rim structure comprising a cylindrical hub having a radial portion provided with an internal outwardly flaring conical portion, said conical portion terminating in a coaxial brake drum, and a pair of rim elements secured together and to said radial portion, one of said rim elements having an outwardly flaring conical portion seating against said conical portion of said hub and the other of said rim elements having an outwardly flaring conical portion diverging away from the corresponding conical portion of the other and also having an angle shaped reinforcing ring abutting the conical portion thereof, both said conical portions of said rim elements having marginal angle shaped bead supporting portions.

ALGER G. MARANVILLE.